US008775172B2

(12) United States Patent
Konchitsky et al.

(10) Patent No.: US 8,775,172 B2
(45) Date of Patent: Jul. 8, 2014

(54) MACHINE FOR ENABLING AND DISABLING NOISE REDUCTION (MEDNR) BASED ON A THRESHOLD

(75) Inventors: Alon Konchitsky, Santa Clara, CA (US); Alberto D Berstein, Cupertino, CA (US); Sandeep Kulakcherla, Santa Clara, CA (US)

(73) Assignee: Noise Free Wireless, Inc., Santa Clara, CA (US)

(*) Notice: Subject to any disclaimer, the term of this patent is extended or adjusted under 35 U.S.C. 154(b) by 497 days.

(21) Appl. No.: 13/083,513

(22) Filed: Apr. 8, 2011

(65) Prior Publication Data

US 2012/0084080 A1 Apr. 5, 2012

Related U.S. Application Data

(60) Provisional application No. 61/389,203, filed on Oct. 2, 2010.

(51) Int. Cl.
*G10L 21/00* (2013.01)
*H04B 15/00* (2006.01)

(52) U.S. Cl.
USPC ........................... 704/226; 704/210; 381/94.1

(58) Field of Classification Search
CPC ..... G10L 21/0208; G10L 25/78; G10L 21/02; G10L 15/20; G10L 2021/02166; G10L 17/00; G10L 21/0272; G10L 25/48; G10L 15/24; G10L 21/06; H04B 15/00; H03G 7/002; H03G 7/007; H03G 9/18; H03G 3/20; H03G 9/005; H03G 3/32; H03G 11/008; H03G 3/001; H03G 3/004
USPC .................. 704/226–228, 233, 210; 381/94.1
See application file for complete search history.

(56) References Cited

U.S. PATENT DOCUMENTS 5,263,091 A * 11/1993 Waller, Jr. .................... 381/94.1
6,230,123 B1 * 5/2001 Mekuria et al. ............... 704/226
7,146,314 B2 * 12/2006 Wang ............................ 704/233
2008/0249771 A1 * 10/2008 Wahab .......................... 704/233

FOREIGN PATENT DOCUMENTS

GB 2455824 A * 6/2009

* cited by examiner

*Primary Examiner* — Angela A Armstrong
(74) *Attorney, Agent, or Firm* — Steven A. Nielsen; Allman & Nielsen, P.C.

(57) ABSTRACT

The present invention provides a novel system and method for monitoring the audio signals, analyze selected audio signal components, compare the results of analysis with a threshold value, and enable or disable noise reduction capability of a communication device.

2 Claims, 12 Drawing Sheets

General block diagram of a Microprocessor system

MACHINE FOR ENABLING AND DISABLING NOISE REDUCTION (MEDNR) BASED ON A THRESHOLD

Background noise is a major problem when processing audio signals. It is usually caused by engines, blowers, fans, air conditioners, cars, busy intersections, people talking in restaurants etc. If untreated, this noise can be annoying at times. To cope with this problem, the signal is processed in a Digital Signal Processor (DSP) where the noisy signal, picked up by the microphone, is digitized by an Analog to Digital Converter (ADC) and fed to the DSP for analysis and noise reduction. However, communication devices are not always used in noisy environments. In such cases, there is no need for noise reduction. This saves power, increases battery life and reduces crucial processing times which are critical to a communication device. Also in multi-channel environments like voice gateways, servers, conference bridges etc there should be flexibility to disable noise reduction based on a threshold to save power, MIPS (Millions of Instructions per Second), reduce program space, data space required by complex noise reduction algorithms which increase the channel capacity.

The invention automatically enables and disables noise reduction based on a noise threshold. This threshold can be pre-defined by a user for a particular machine or can be defined "on the fly" before/during a telephonic conversation. With this flexibility, the users can "by-pass" the noise reduction and preserve the voice quality which are usually altered/ modified by noise reduction algorithms.

FIELD OF THE INVENTION

The present invention relates to means and methods of providing clear, high quality voice both in presence and absence of background noise in voice communication systems, devices, telephones, voice communication gateways, multi-channel environments etc.

This invention is in the field of processing audio signals in cell phones, Bluetooth headsets, VoIP telephones, gateways etc and in general any single channel or multi channel communication device(s) operating both in a noisy and non-noisy (quite) environments.

The invention relates to the field of providing a means to save power, increase battery life, reduce crucial processing time, program space, and data space and reduce MIPS in a communication devices, gateways, servers, multi-channel environments etc.

BACKGROUND OF THE INVENTION

Modern day communication devices operate in a myriad of environments. Some of these environments may be extremely noisy (bars, crowded restaurants etc.) and some may be extremely quite (home, relaxing lounge etc.). In all communication devices, the microphone(s) pick up the desired signal and background noise (if present). If the environment in which the communication device is operating is noisy, the noise signal should be cancelled before being transmitted to the other end of the communication for the conversation to be pleasant and discernable.

The noise reduction algorithms, however, come at an expense of battery life, power, MIPS (Millions of Instructions per Second), huge program space, data space and crucial processing time. Not all communication devices operate in noisy environments. In other words, a single communication device operates in noisy and non-noisy/quiet environments. Simply put, not all devices need noise reduction at all times.

Voice gateways, conference bridges and similar devices should be able to enable or disable noise reduction based on a threshold during "peak" times and avoid overloading the systems. Disabling noise reduction saves crucial processing time, data space, code space and increases channel capacity in a multi channel environment.

SUMMARY OF THE INVENTION

The present invention provides a novel system and method for monitoring the audio signals, analyze selected audio signal components, compare the results of analysis with a threshold value, and enable or disable noise reduction capability of a communication device.

In one aspect of the invention, the threshold can be predefined by the user, manufacturer or can be set "on the fly" in real time during a telephonic conversation.

In another aspect of the invention, the invention can be used in communication devices which perform noise reduction on the received signals which are reproduced at the earpiece of the communication device.

In another aspect of the invention, the invention provides the flexibility to disable noise reduction if there is no background noise or if it is less than the set threshold to save crucial processing times, data space, program space required by the complex noise reduction algorithms and increases the channel capacity in gateways, conference bridges, networks, servers and any multi-channel environment.

In another aspect of the invention, the invention provides flexibility to the users so they can "by-pass" the noise cancellation by modifying the threshold and preserve the voice quality which are usually altered/modified by noise reduction algorithms.

In yet another aspect of the invention, the invention can be added as a module to the already existing devices with noise reduction capability. In such cases, the current invention enhances the battery life, reduces the power consumption, MIPS etc. However, it does not interfere with the native noise reduction algorithms.

Other features and advantages of the invention will become apparent to one with skill in the art upon examination of the following figures and detailed description. All such features, advantages are included within this description and be within the scope of the invention and be protected by the claims.

BRIEF DESCRIPTION OF THE DRAWINGS

The invention is better understood in conjunction with detailed description and the figures. It should be noted that the components, blocks in the figures are not to scale and are used only for descriptive purposes.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

Figure 1A:
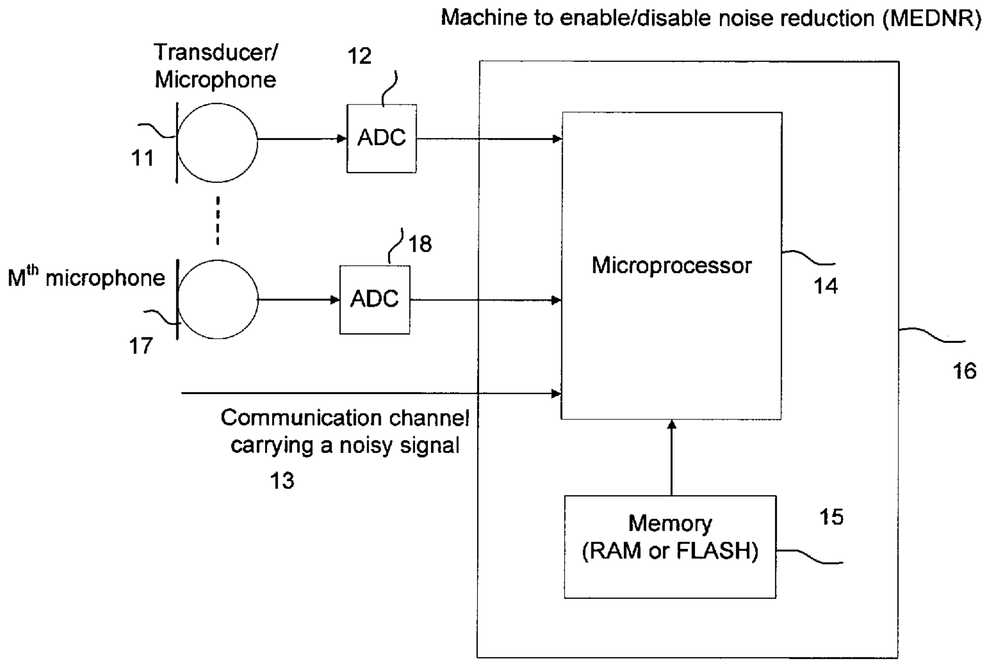
FIG. 1*a* shows the embodiments of the Machine for Enabling and Disabling Noise Reduction (MEDNR) as described in the current invention.

FIG. 1*a* shows the embodiments of the Machine for Enabling and Disabling Noise Reduction (MEDNR) as described in the current invention. The transducer/microphone, 11, of the communication device, picks up the analog signal. It should be noted by people skilled in the art that the communication device can have M number of microphone(s), where M>1. The Analog to Digital Converter (ADC), block 12, converts the analog signal to digital signal. Block 17 and 18 are $M^{th}$ microphone and ADC respectively. The digital signal is then sent to the MEDNR, block 16. In general any communication signal received from a communication device, in its digital form, is sent to the MEDNR. The MEDNR (block 16) consists of a microprocessor, block 14 and a memory, block 15. The microprocessor can be a general purpose Digital Signal Processor (DSP), fixed point or floating point, or a specialized DSP (fixed point or floating point).

Examples of DSP include Texas Instruments (TI) TMS320VC5510, TMS320VC6713, TMS320VC6416 or Analog Devices (ADI) BF531, BF532, 533 etc or Cambridge Silicon Radio (CSR) Blue Core 5 Multi-media (BC5-MM) or Blue Core 7 Multi-media BC7-MM etc. In general, the MEDNR can be implemented on any general purpose fixed point/floating point DSP or a specialized fixed point/floating point DSP.

The memory can be Random Access Memory (RAM) based or FLASH based and can be internal (on-chip) or external memory (off-chip). The instructions reside in the internal or external memory. The microprocessor, in this case a DSP, fetches instructions from the memory and executes them.

Figure 1B:
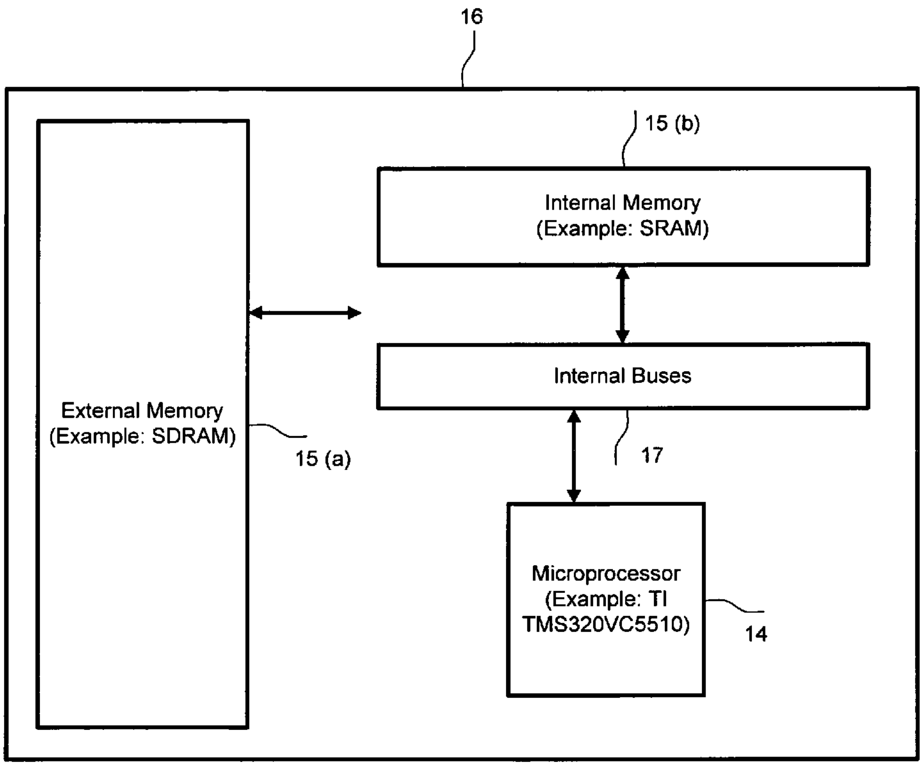
FIG. 1*b* shows the general block diagram of a microprocessor system.

FIG. 1*b* shows the embodiments of block 16. It is a general block diagram of a DSP system where MEDNR is implemented. The internal memory, block 15 (*b*) for example, can be SRAM (Static Random Access Memory) and the external memory, block 15 (*a*) for example, can be SDRAM (Synchronous Dynamic Random Access Memory). The microprocessor, block 14 for example, can be TI TMS320VC5510. However, those skilled in the art can appreciate the fact that the block 14, can be a microprocessor, a general purpose fixed/floating point DSP or a specialized fixed/floating point DSP. The internal buses, block 17, are physical connections that are used to transfer data. All the instructions to enable or disable noise reduction reside in the memory and are executed in the microprocessor.

Figure 2:
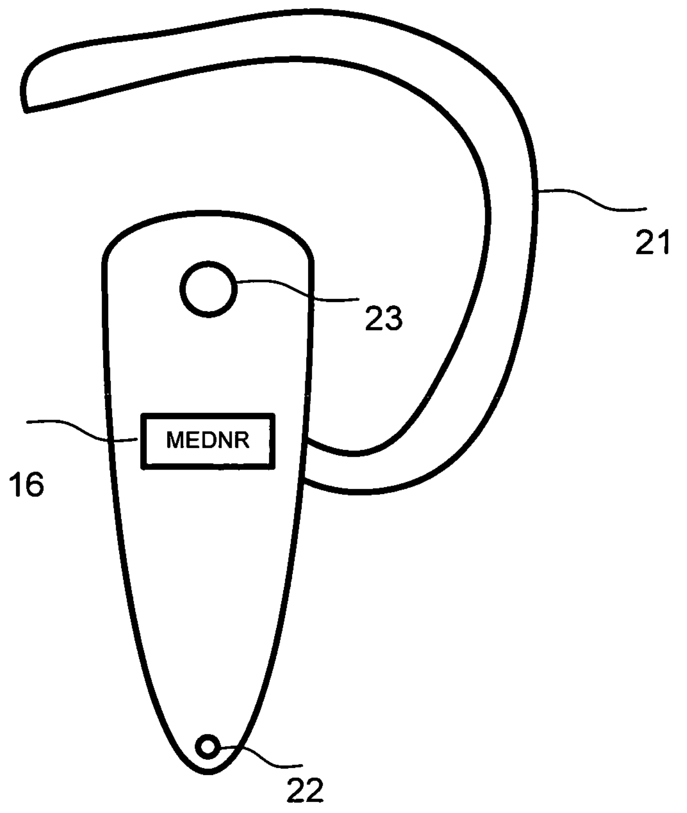
FIG. 2 shows the application of MEDNR in a Bluetooth headset.

FIG. 2 shows a Bluetooth headset with MEDNR. In FIG. 2, 22 is the microphone of the device. 23 is the speaker of the device. 21 is the ear hook of the device. Block 16 is the MEDNR which decides if the noise reduction should be enabled or disabled. People skilled in the art can appreciate the fact that the Bluetooth headset can have M number of microphone(s), where M≥1.

Figure 3:
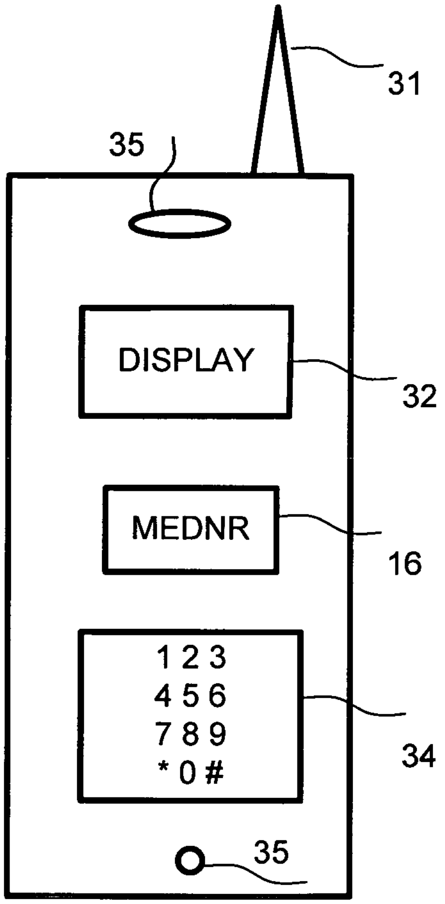
FIG. 3 shows the application of MEDNR in a cell phone.

FIG. 3 shows a cell phone with MEDNR. In FIG. 3, 31 is the antenna of the cell phone, 35 is the loudspeaker. 36 is the microphone. 32 is the display, 34 is the keypad of the cell phone. Block 16 is the MEDNR which decides if the noise reduction should be enabled or disabled. People skilled in the art can appreciate the fact that the cell phone can have M number of microphone(s), where M≥1.

Figure 4:
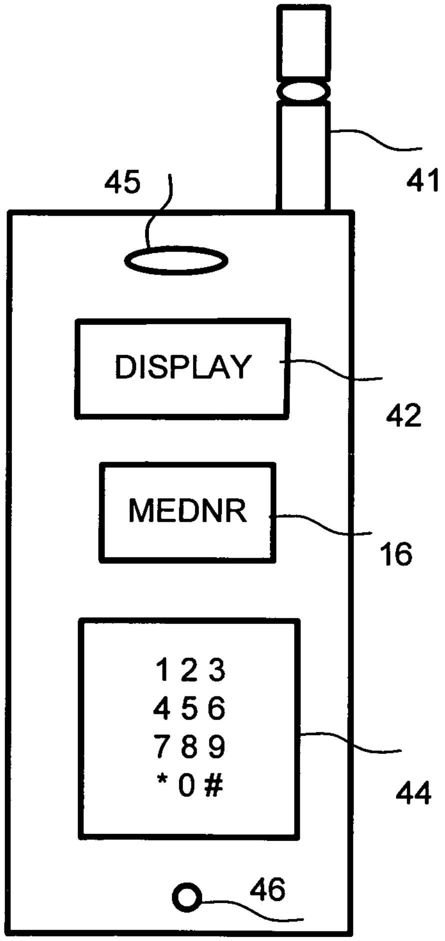
FIG. 4 shows the application of MEDNR in a cordless phone.

FIG. 4 shows a cordless phone with MEDNR. In FIG. 4, 41 is the antenna of the cell phone, 45 is the loudspeaker. 46 is the microphone. 42 is the display, 44 is the keypad of the cell phone. Block 16 is the MEDNR which decides if the noise reduction should be enabled or disabled. People skilled in the art can appreciate the fact that the cordless phone can have M number of microphone(s), where M≥1.

Figure 5:
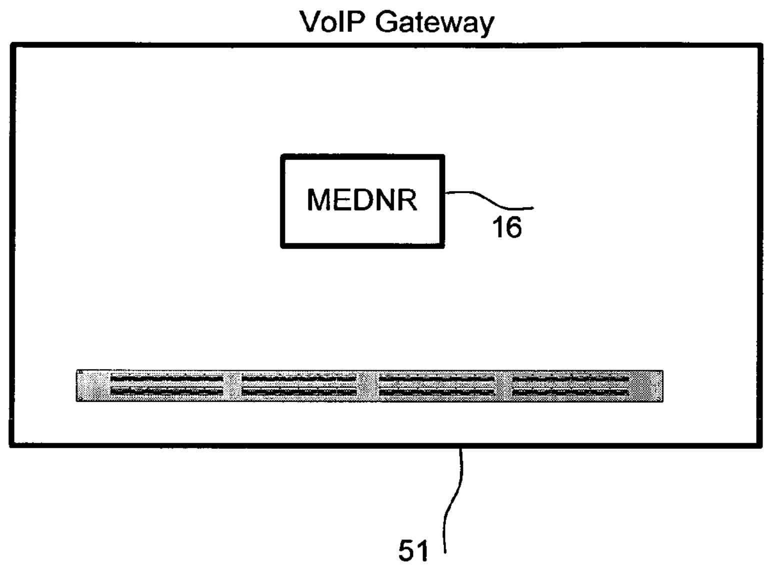
FIG. 5 shows the application of MEDNR in a VoIP gateway.

FIG. 5 shows a VoIP gateway, 51 with MEDNR. Block 16 is the MEDNR which decides if the noise reduction should be enabled or disabled. People skilled in the art can appreciate the fact that the gateway can have M number of channels, where M≥1.

Figure 6:
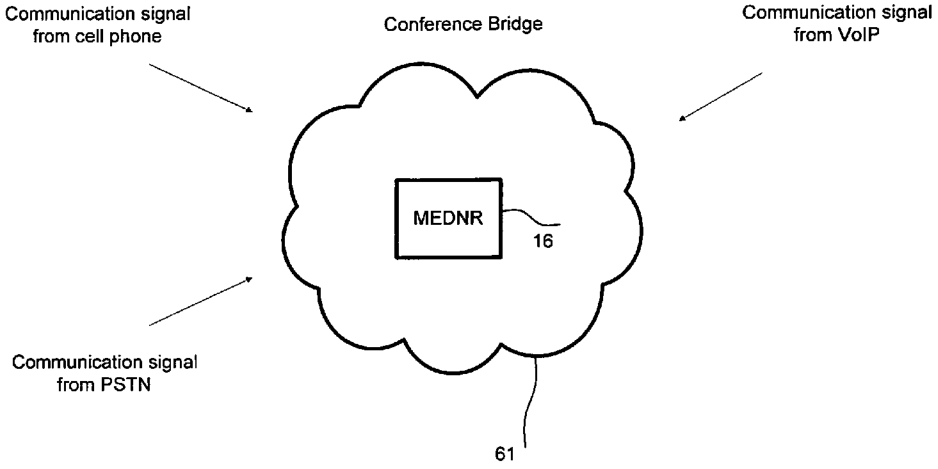
FIG. 6 shows the application of MEDNR in a conference bridge environment.

FIG. 6 shows a Conference Bridge, 61 with MEDNR. Block 16 is the MEDNR which decides if the noise reduction should be enabled or disabled. People skilled in the art can appreciate the fact that the Conference Bridge can have M number of channels, where M≥1.

Figure 7:
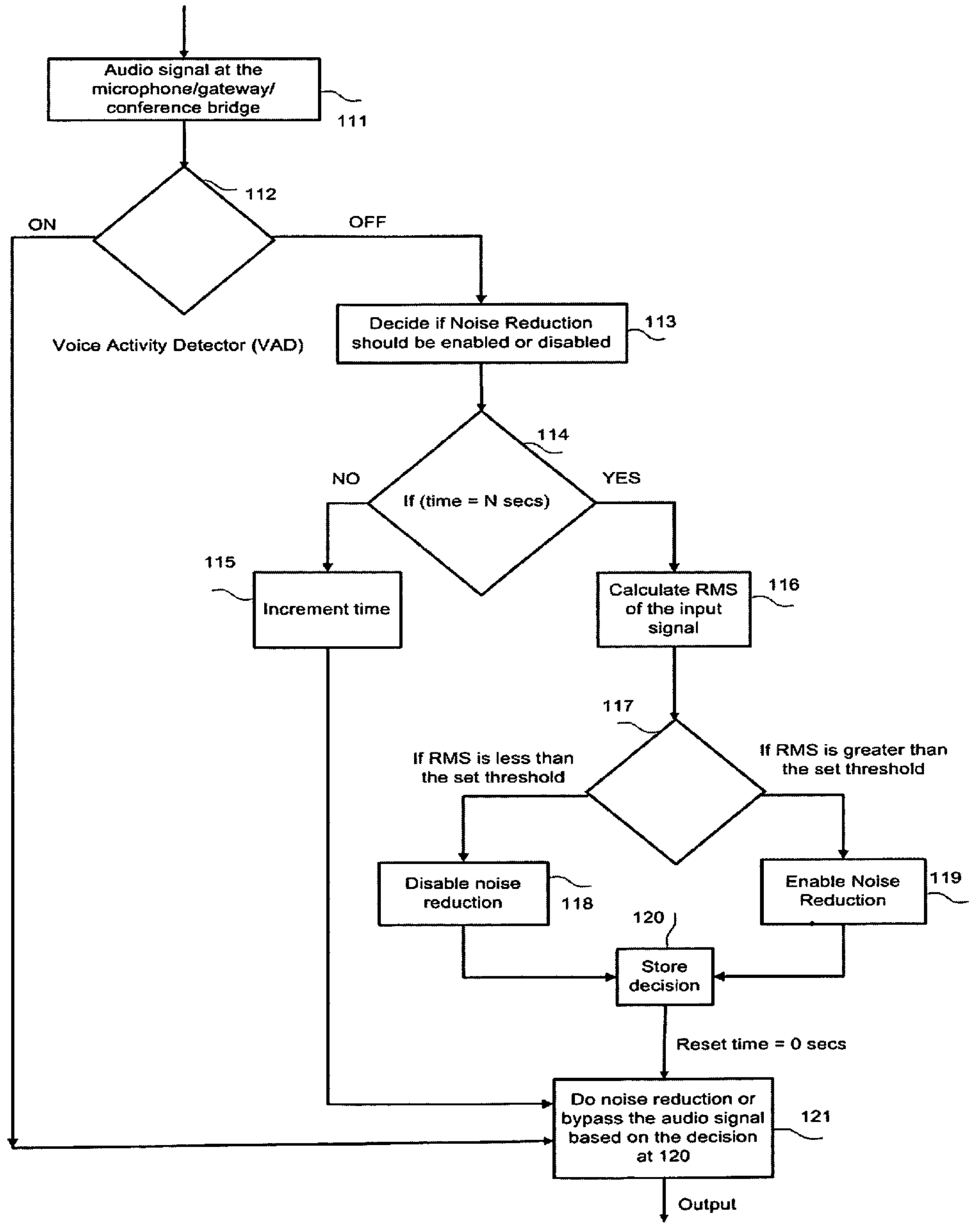
FIG. 7 shows various steps of the current invention involved in the process of enabling/disabling noise reduction based on a threshold.

FIG. 7 shows various steps of the current invention involved in the process of enabling/disabling noise reduction based on a threshold. The audio signal is received at block 111. This audio signal may be the signal received in Voice gateway, Conference Bridge etc. It may also be the signal(s) picked up by the communication device with one or M number of microphone(s), where M>1. Block 112 is a Voice Activity Detector (VAD) which makes a decision if the audio signal is speech or noise/non-speech. If the incoming signal is decided as noise/non-speech, the VAD is OFF. If the incoming signal is decided as speech, the VAD is ON. If the VAD is OFF, the control goes to the block 113 which decides if the noise reduction should be enabled or disabled. This decision is made for every N seconds, at block 114.

N can be as small as the "frame size" used in the communication. For example, in narrowband and wideband communication systems, the frame size is 20 and 10 milli-seconds respectively. Therefore, N≥20 milli-seconds and N≥10 milli-seconds for narrowband and wideband respectively. If the communication device, system uses 5 or 1 milli-second frame size, then N≥5 or 1 milli-second(s). The upper limit for N is programmable by the end-user, manufacturer or can be set during production stage, before/during a conversation.

If the time is equal to N seconds, at block 114, Root Mean Square (RMS) value of the input signal is calculated at block 116. If not, the time is incremented, at block 115. The RMS of the input signal is calculated as follows:

InputSignalSquare=0

Loop i=1 to P $$\text{InputSignalSquare}=\text{InputSignalSquare}+\text{input}[i]^2 \quad (1)$$

End loop

Where "i" is the index, P is the number of samples in each frame. Example, there are 160 samples in each frame for narrowband communication system. In equation (1), "input[ ]" is the audio signal picked up by the microphone(s) or received at the conference bridge, gateway etc.

$$MeanSquare = \frac{InputSignalSquare}{P} \quad (2)$$

$$\text{RMS} = \sqrt{MeanSquare} \quad (3)$$

$$\text{RMS (dB)} = 10\log_{10}(\text{RMS}) \quad (4)$$

The RMS and/or RMS (dB) calculated in equations (3) and (4) respectively are compared to a set threshold. This threshold can be pre-defined, set by the end-user, manufacturer at the beginning of the conversation or can be set "on the fly" in real-time during conversation. If the RMS and/or RMS (dB) is greater than the threshold, noise reduction is enabled at block 119. If the RMS and/or RMS (dB) is less than the threshold, noise reduction is disabled at block 118. For convenience, this enable or disable decision is stored in a binary format (1 and 0) at block 120. It should be noted that this decision can be stored in any other machine readable format.

Once the decision is stored, the time is reset to zero seconds and the audio signal received at block 111 is either bypassed or processed with noise reduction algorithms (block 121 based on the decision at 120. At block 114, if time is not equal to N seconds, the time is incremented and the control goes to block 121 where the stored decision (block 120) is used to either by pass or perform noise reduction on the audio signal. If at block 112, the VAD decides that the audio signal is speech, the control goes to block 121 where the stored decision (block 120) is used to either by pass or perform noise reduction.

When the program is first launched and until the time is equal to N seconds, the default initial value at block 120 can be either "1" or "0". This initial time can be completely independent of time N seconds. For narrowband and wideband communication systems, Initial time ≥20 milli-seconds and Initial time ≥10 milli-seconds respectively. For example, users may want noise reduction to be initially enabled or disabled for the first 60 seconds (Initial time) irrespective of the amount of noise they have in the background. But after that, the users may want the system to automatically decide to enable and disable noise reduction every 5 seconds (N seconds).

Figure 8A:
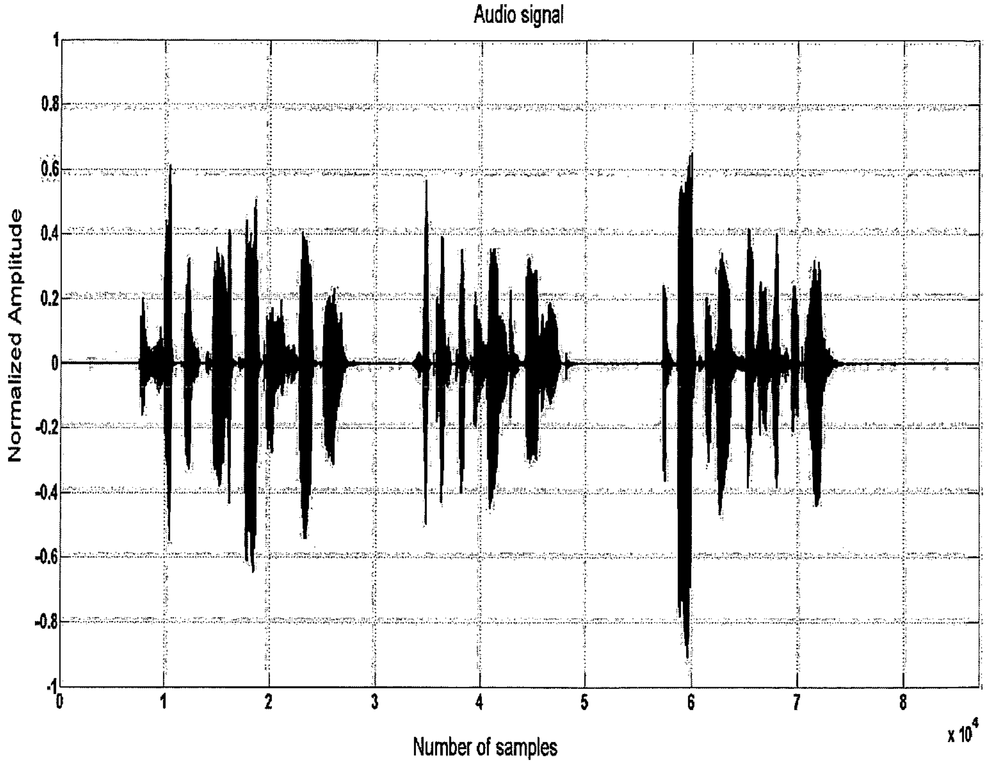
FIG. 8*a* shows the plot of clean speech file with no background noise.

FIG. 8*a* shows the plot of clean speech file with no background noise. The x-axis represents the number of samples and the y-axis represents the normalized amplitude [−1 1] of the audio signal. [−1 1] represents +32,767 to −32768 for 16-bit audio codecs. It should be noted that each sample is equal to 20 milli-seconds at 8000 Hz sampling rate.

Figure 8B:
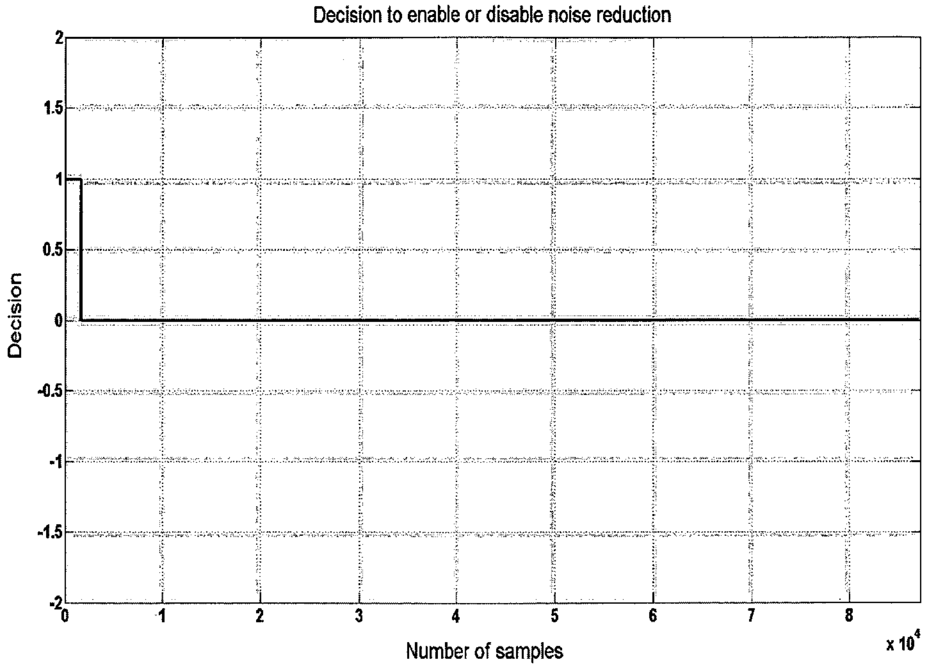
FIG. 8*b* shows the plot of the decision to enable or disable noise reduction, based on a threshold for the audio signal described above.

FIG. 8*b* shows the plot of the decision to enable or disable noise reduction, for the audio signal described above based on the threshold. If the decision is "zero", the noise reduction is disabled. If the decision is "one", then the noise reduction is enabled. It should be noted that in this particular example, the initial decision is forced to be "one". The initial decision can be either zero or one depending on personal, end-user or manufacturer's preference. The initial decision in this case is about 1600 samples which corresponds to 200 milli-seconds at 8000 Hertz sampling rate. This initial decision is programmable and can be modified/configured. In this particular example, the threshold is set at −50 dB. It can be seen that after 1600 samples (200 milli-seconds); the noise reduction is disabled as the RMS (dB) value of the non-speech durations is less than −50 dB. For this particular example, N is chosen to be 200 milli-seconds. The RMS (dB) value is calculated using equations (1), (2), (3) and (4) respectively, when VAD decision is OFF.

Figure 9A:
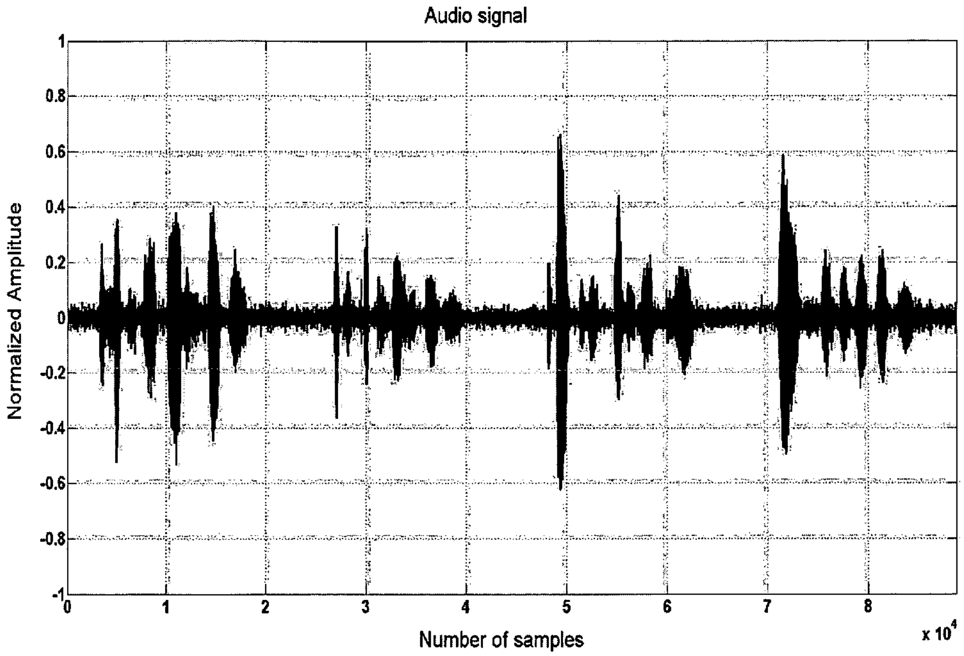
FIG. 9*a* shows the plot of clean speech file corrupted with background noise (street noise).

FIG. 9*a* shows the plot of clean speech file corrupted with background noise (street noise). The x-axis represents the number of samples and the y-axis represents the normalized amplitude [−1 1] of the audio signal. [−1 1] represents +32,767 to −32768 for 16-bit audio codecs. It should be noted that each sample is equal to 20 milli-seconds at 8000 Hz sampling rate.

Figure 9B:
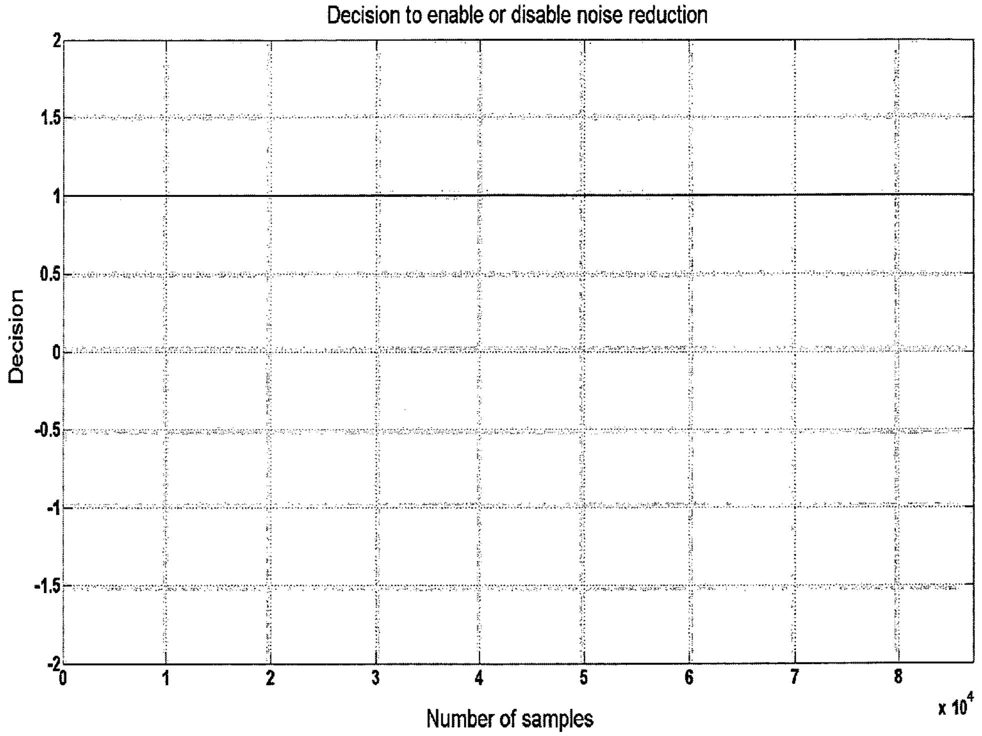
FIG. 9*b* shows the plot of the decision to enable or disable noise reduction, based on a threshold for the audio signal described above.

FIG. 9*b* shows the plot of the decision to enable or disable noise reduction, for the audio signal described above based on the threshold. A decision of "one" means the noise reduction is enabled. A decision of "zero" means the noise reduction is disabled. It should be noted that in this particular example, the initial decision is forced to be "one" which is about 1600 samples which corresponds to 200 milli-seconds at 8000 Hertz sampling rate. For this particular example, the threshold is set at −50 dB. After 1600 samples (200 milli-seconds); the noise reduction is enabled as RMS (dB) value of non-speech durations is greater than −50 dB. For this particular example, N is chosen to be 200 milli-seconds. The RMS (dB) value is calculated using equations (1), (2), (3) and (4) respectively, when VAD decision is OFF.

What is claimed is:

1. A machine to automatically enable and disable noise reduction feature of a communication device, the machine comprising:

one or more inputs for receiving signals from the communication device;

a memory for storing program instructions;

a microprocessor configured to execute the program instructions for performing:

a) setting a threshold value received from a user;

b) calculating after every 'N' seconds, RMS value of the signals received from the communication device;

c) comparing the threshold value and the RMS value to obtain a single decision value;

d) storing in the memory, the single decision value corresponding to either enabling or disabling the noise reduction feature of the communication device, wherein the decision value corresponds to disabling of the noise reduction feature if the RMS value is less than the threshold value, and wherein the decision value corresponds to enabling of the noise reduction feature if the RMS value is greater than the threshold value;

e) enabling or disabling the noise reduction feature of the communication device based on the decision value.

2. A system for controlling noise reduction feature of one or more communication device, the system comprising:

a) the one or more communication devices, each having one or more microphones for receiving input signals;

b) a voice activity detector ("VAD") connected to the one or more communication devices for determining if the received signal is speech or noise, wherein the VAD is turned OFF when the determined signal is a noise signal, and wherein the VAD is turned 'ON' when the determined signal is a speech signal;

c) a machine to automatically enable and disable noise reduction feature of the one or more communication device, the machine comprising:

one or more inputs for receiving signals from the communication device;

a memory for storing program instructions;

a microprocessor configured to execute the program instructions for performing:

i. setting a threshold value received from a user;

ii. calculating after every 'N' seconds, RMS value of the signals received from the communication device;

iii. comparing the threshold value and the RMS value to obtain a single decision value;

iv. storing in the memory, a single decision value corresponding to either enabling or disabling the noise reduction feature of the communication device, wherein the decision value corresponds to disabling the noise reduction feature if the RMS value is less than the threshold value, and wherein the decision value corresponds to enabling the noise reduction feature if the RMS value is greater than the threshold value;

v. enabling or disabling the noise reduction feature of the communication device based on the decision value.

* * * * *